(12) United States Patent
Huang et al.

(10) Patent No.: US 6,266,361 B1
(45) Date of Patent: Jul. 24, 2001

(54) METHOD AND ARCHITECTURE FOR CORRECTING CARRIER FREQUENCY OFFSET AND SPREADING CODE TIMING OFFSET IN A DIRECT SEQUENCE SPREAD SPECTRUM COMMUNICATION SYSTEM

(75) Inventors: Chia-Chi Huang; Shin-Yuan Wang, both of Hsinchu; Yuh-Maiw Jong, Taoyuan Hsien, all of (TW)

(73) Assignee: Chung-Shan Institute of Science and Technology, Lung-Tan Taoyuan (TW)

( * ) Notice: Subject to any disclaimer, the term of this patent is extended or adjusted under 35 U.S.C. 154(b) by 0 days.

(21) Appl. No.: 09/120,497

(22) Filed: Jul. 21, 1998

(51) Int. Cl.[7] ................................ A61F 2/06; H04L 27/30
(52) U.S. Cl. ............................................................ 375/140
(58) Field of Search .................................... 375/140, 142, 375/143, 149, 150, 152, 367

(56) References Cited

U.S. PATENT DOCUMENTS

| | | |
|---|---|---|
| 4,601,005 | 7/1986 | Kilvington . |
| 4,998,111 | 3/1991 | Ma et al. . |
| 5,640,416 * | 6/1997 | Chalmers .......................... 375/206 |
| 5,732,111 * | 3/1998 | Walley ............................... 375/344 |
| 6,005,889 * | 12/1999 | Chung et al. ...................... 375/208 |
| 6,097,770 * | 8/2000 | Bahai et al. ...................... 375/343 |

* cited by examiner

Primary Examiner—Chi Pham
Assistant Examiner—Jean Corrielus
(74) Attorney, Agent, or Firm—Christensen O'Connor Johnson Kindness PLLC

(57) ABSTRACT

A method and an architecture for correcting carrier frequency offset and spreading code timing offset in a direct sequence spread spectrum communication system are disclosed. In the present invention, the carrier frequency offset is divided into an integer part and a fractional part, wherein the integer part is defined as integer multiples of the reciprocal of the period of a spreading code. The integer part of the carrier frequency offset can be obtained by matching received signals with a spreading code whose central frequency is located at integer multiples of the reciprocal of the period of the spreading code and searching the one, of the matched results, with the largest amplitude. Besides, a direction flag can be obtained by comparing the amplitude of the searched one with that of the matched results neighboring the searched one. After correcting the integer part carrier frequency offset, the difference between the phase angles of two successive matched results can be calculated and used to calculate the fractional part of the carrier frequency offset according to the direction sag. After the carrier frequency offset is corrected, the correction of the timing offset of the spreading code can be made by searching for the first path of the channel impulse response which produces the minimum delay spread.

28 Claims, 8 Drawing Sheets

METHOD AND ARCHITECTURE FOR CORRECTING CARRIER FREQUENCY OFFSET AND SPREADING CODE TIMING OFFSET IN A DIRECT SEQUENCE SPREAD SPECTRUM COMMUNICATION SYSTEM

FIELD OF THE INVENTION

The present invention relates to the field of direct sequence spread spectrum communication, in particular, to the correction of carrier frequency offset and spreading code timing offset in a direct sequence spread spectrum communication system.

BACKGROUND OF THE INVENTION

In direct sequence spread spectrum communication, before data detection, the carrier frequency offset and spreading code timing offset must be corrected to synchronize to the carrier and the spreading code. Sliding correlator has been used in prior art to correct the spreading code timing offset. However, such a way is time consuming and cannot be effectively down before carrier recovery because the received signal is affected by carrier offset.

Another method uses a matched filter for code despreading and then use a phase-lock loop to estimate the carrier frequency offset. However, the application of this prior method is limited to the condition that the carrier frequency offset is smaller than the reciprocal of the period of the spreading code. In fact, in direct sequence spread spectrum communication, the carrier frequency offset is generally larger than the reciprocal of the period of the spreading code, and thus the prior method is hardly applicable.

U.S. Pat. Nos. 4,601,005 and 4,998,111 provide a method of matching the fast Fourier transform (FFT) of spreading code with the FFT of received signals. The method of the two patents is designed for the global positioning system (GPS), and utilizing the way of increasing the points of FFT calculations of a matched filter to improve the precision of the estimate of carrier frequency offset. Such a method is practicable for data transmission rate of GPS signals of 50 bits/sec. However, the data transmission rate of a general direct sequence spread spectrum communication system, such as a code division multiple access (CDMA) system, is far larger than 50 bits/sec. Therefore, the above-mentioned method is not practicable in a general direct sequence spread spectrum communication system. Besides, the above-mentioned patents both use the output maximum peak of a matched filter as the starting point of a spreading code because there is only one main path in satellite communication channel and thus only one maximum peak will be generated. However, the transmission channel of a general direct sequence spread spectrum communication system usually has multiple paths, for embodiment, the communication channel of a CDMA system is a multipath fading channel, and thus the output maximum peak of a matched filter may not be the first-path of the channel.

Based on the disadvantages of the above-mentioned prior art and the problems associated therewith, an object of the present invention is to provide a method and apparatus for correcting carrier frequency offset in a general direct sequence spread spectrum communication system.

Another object of the present invention is to provide a method and apparatus for correcting both the carrier frequency offset and spreading code timing offset of a general direct sequence spread spectrum communication system.

A further object in the present invention is to provide a method and apparatus for the correction of carrier frequency offset in all direct sequence spread spectrum communication systems and timing offset of spreading code in said systems.

Again, a further object of the present invention is to provide a method and apparatus for wholly digitized correction of carrier frequency offset and spreading code timing offset in a direct sequence spread spectrum system, so as to be implemented with integrated circuit technology to achieve a small and compact design.

SUMMARY OF THE INVENTION

The present invention first provides that the correction of carrier frequency offset is divided into the correction of integer part of carrier frequency offset and the correction of fractional part of carrier frequency offset, wherein the integer part of carrier frequency offset is defined as an integral multiple of the reciprocal of the period of a spreading code and the fractional part of carrier frequency offset is smaller than the reciprocal of the period of the spreading code.

The integer part of the carrier frequency offset can be obtained quickly, according to the regularity thereof, by matching received signals with the spreading code whose central frequency is located at integer multiples of the reciprocal of the period of the spreading code and searching the one, of the matched results, with the largest amplitude.

Based on the fact that the fractional part of carrier frequency offset is smaller than the reciprocal of the period of the spreading code, the fractional part of carrier frequency offset can be calculated by using the phase-angle difference calculated from the matched results mentioned above.

Above described method of the present invention can simply and effectively correct random carrier frequency offsets, and can be practiced in wholly digitized manner; and can be used in combination with any prior technique of correcting timing offset of a spreading code.

In addition, for the direct sequence spread spectrum communication system with carrier frequency offset been corrected, the present invention first provide that the timing offset of a spreading code can be determined by using the fact that a channel is a minimum phase system which has the characteristic of minimum energy delay to search the one with minimum delay spread. The method of the present invention for correcting timing offset of a spreading code be implemented in a wholly digitized manner.

The above-mentioned method of the present invention for correcting carrier frequency offset and spreading code timing offset can be used in a direct sequence spread spectrum communication system in a multipath fading channel.

Some direct sequence spread spectrum communication systems have a pilot signal, and some do not. For a direct sequence spread spectrum communication system with a pilot signal or not, the method and apparatus of the present invention can utilize the same structure for correct carrier frequency offset and spread spectrum codes series timing offset.

The detail technical content and other technical features of the present invention are explained in the following description with the accompanying drawings.

DESCRIPTION OF REFERENCE NUMERALS

Figure 1:
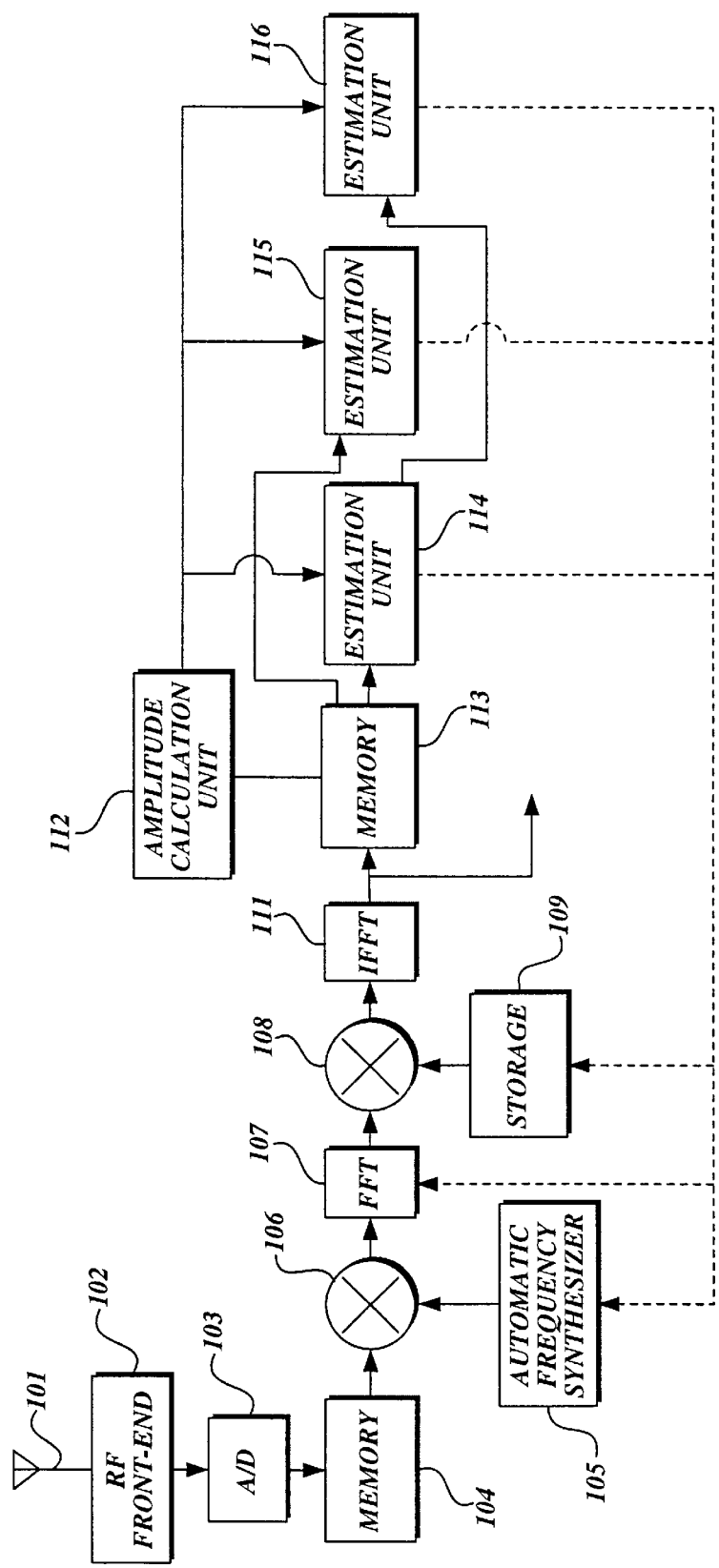
FIG. 1 shows the block diagram of the system architecture of the first embodiment of the present invention.
Figure 3:
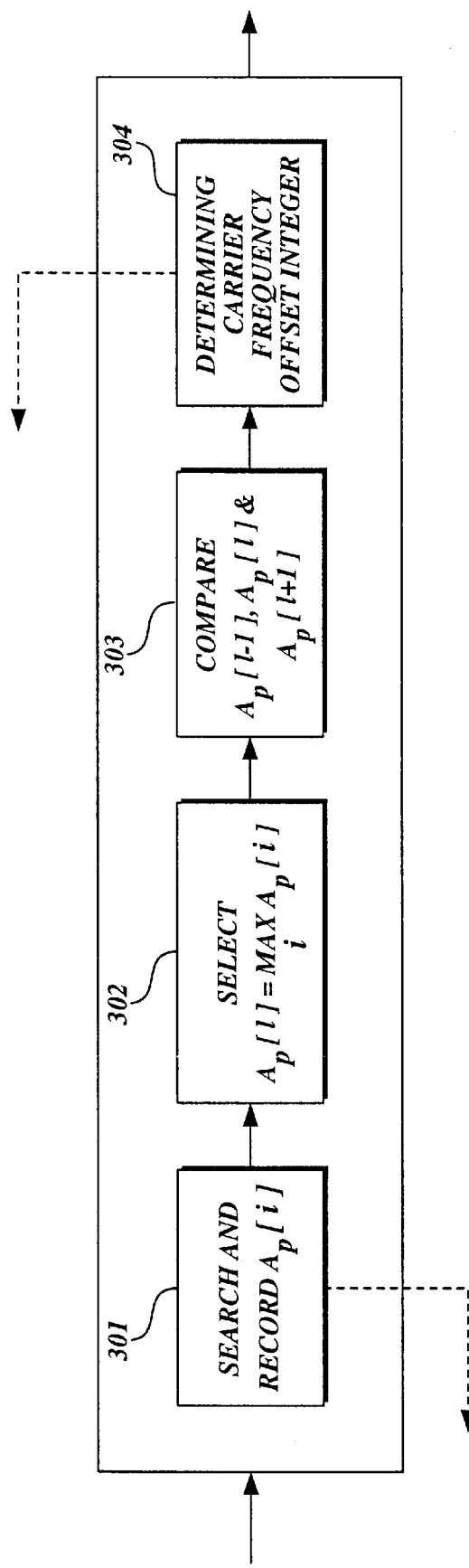
FIG. 3 shows the block diagram of the portion of the correction of the integer part of carrier frequency offset in FIG. 1.

FIG. 1
101 Antenna
102 RF front-end
103 A/D converter
104 Memory
105 Automatic frequency synthesizer
106 complex multiplier
107 Fast Fourier transform (FFT) unit
108 complex multiplier
109 a storage unit to generate the complex conjugate of the FFT of spreading code
111 Inverse fast Fourier transform (IFFT) unit
112 Amplitude calculation unit
113 Memory
114 Estimation unit of integer part of carrier frequency offset
115 Estimation unit of fractional part of carrier frequency offset
116 Estimation unit of timing of spreading code FIG. 3
301 Searching and recording maximum amplitude ($A_p[i]$)
302 Selecting the largest amplitude output $$A_p[l] = \max_i A_p[i]$$

Figure 4:
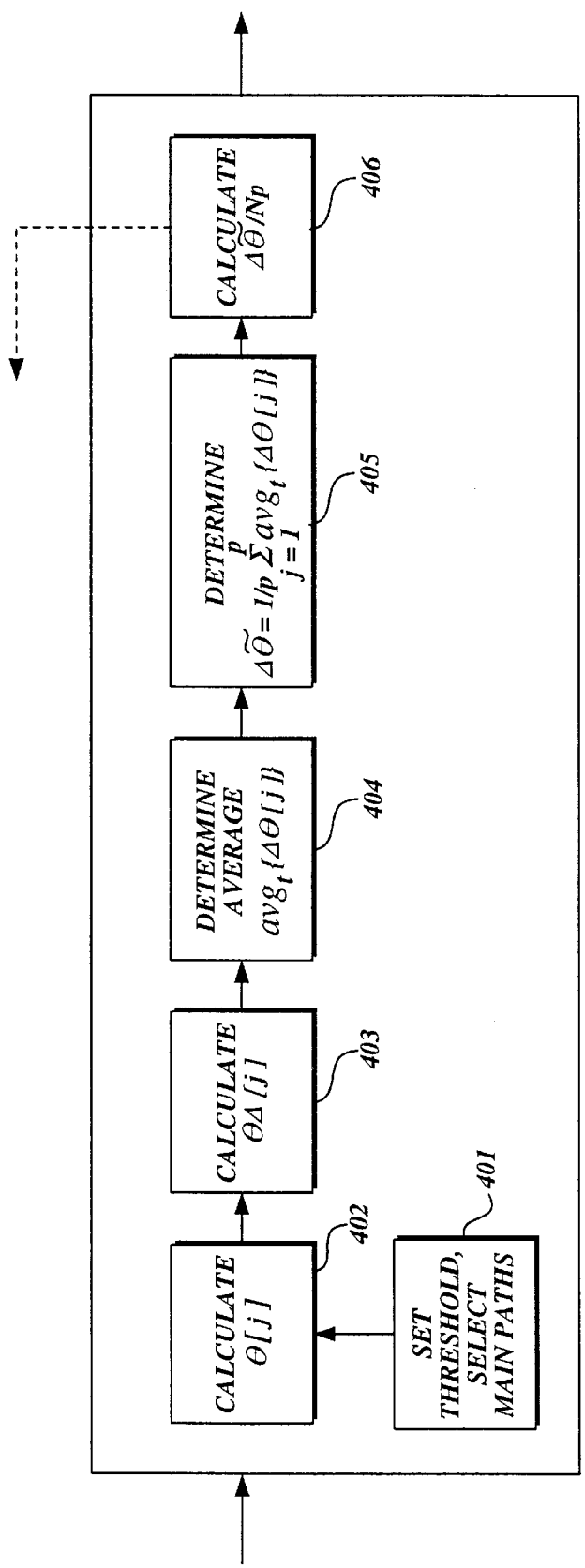
FIG. 4 shows the block diagram of the portion of the correction of the fractional part of carrier frequency offset in FIG. 1.

303 Comparing $A_p[l-1]$, $A_p[l]$ and $A_p[l+1]$ to decide direction flag
304 Determining integer part of carrier frequency offset FIG. 4
401 Setting threshold & Selecting main paths
402 Calculating main path phase angle ($\theta[j]$)
403 Calculating main path phase angle difference ($\Delta\theta[j]$) according to direction flag
404 Time averaging ($avg_t\{\Delta\theta[j]\}$)
405 Path averaging $$\Delta\tilde{\theta} = 1/p \sum_{j=1}^{p} avg_t\{\Delta\theta[j]\}$$

406 Calculating fractional part of carrier frequency offset ($\Delta\theta/N_p$)

Figure 5:
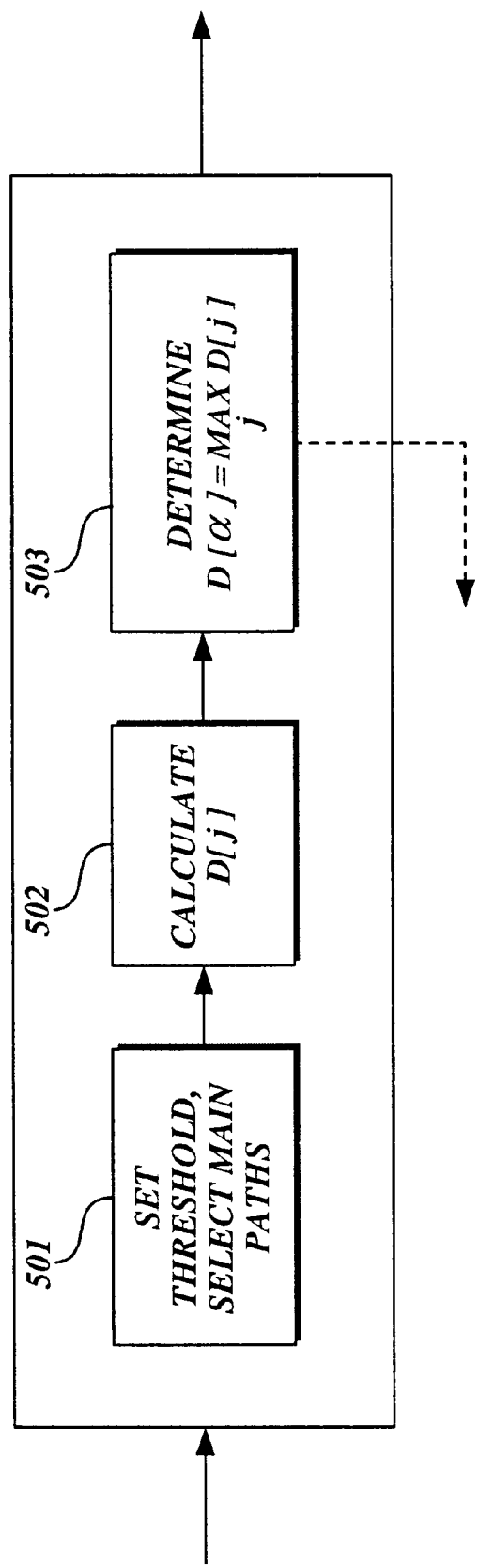
FIG. 5 shows the block diagram of the portion of the correction of spreading code timing offset in FIG. 1.

FIG. 5
501 Setting threshold value & selecting main paths
502 Calculating spread range of main paths ($D[j]$)
503 Determining timing $$D[\alpha] = \max_j D[j]$$

Figure 6:
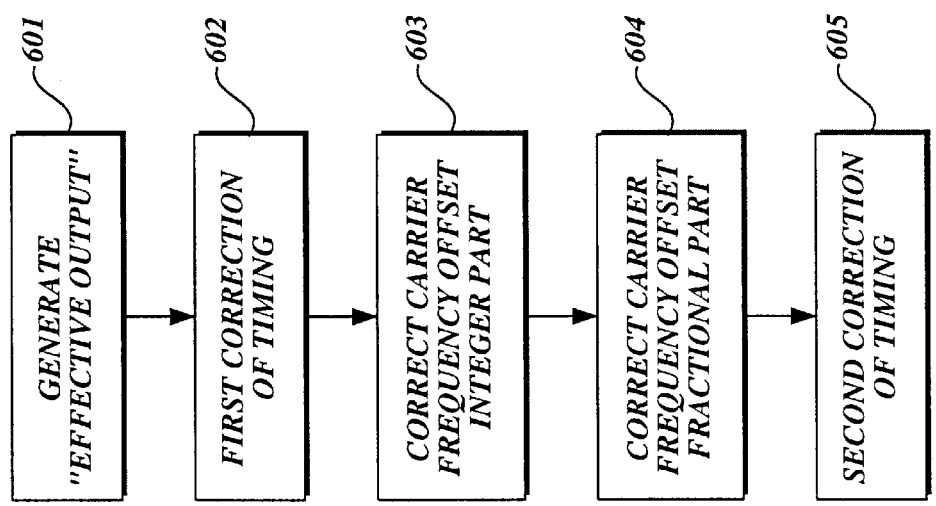
FIG. 6 shows the flow chart of the second embodiment of the present invention.
Figure 8:
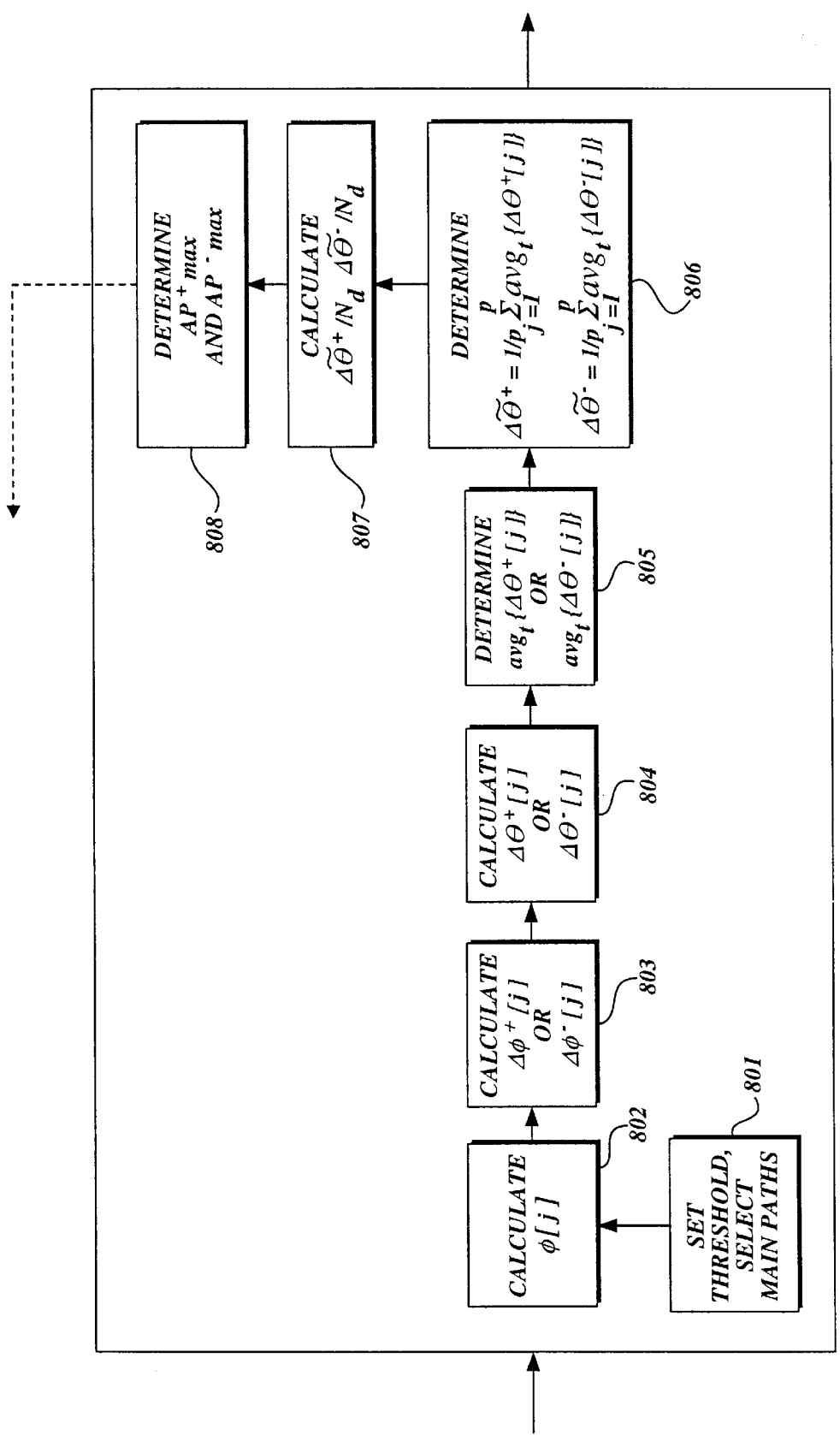
FIG. 8 shows the block diagram of the correction of the fractional part of carrier frequency offset of the second embodiment of the present invention.

FIG. 6
601 Generating "effective output"
602 First correction of timing
603 Correction of integer part of carrier frequency offset
604 Correction of fractional part of carrier frequency offset
605 Second correction of timing FIG. 8
801 Setting threshold & selecting main paths
802 Calculating main path phase angle
803 Calculating main path phase angle difference ($\Delta\phi^+[j]$ or $\Delta\phi^-[j]$) according to direction flag
804 Correcting phase angle difference according to direction flag ($\Delta\theta^+[j]$ or $\Delta\theta^{-[j]}$)
805 Time averaging $$avg_t\{\Delta\theta^+[j]\} \text{ or } avg_t\{\Delta\theta^{-[j]}\}$$

806 Path averaging $$\Delta\tilde{\theta}^+ = 1/p \sum_{j=1}^{p} avg_t\{\Delta\theta^+[j]\} \text{ or } \Delta\tilde{\theta}^- = 1/p \sum_{j=1}^{p} avg_t\{\Delta\theta^-[j]\}$$

807 Calculating fractional part of carrier frequency offset $$(\Delta\theta^+/N_d \text{ or } \Delta\theta^-/N_d)$$

808 Determining fractional part of carrier frequency offset (comparing $AP^+_{max}$ and $AP^-_{max}$)

DETAILED DESCRIPTION OF THE INVENTION

The method and apparatus of the present invention can be applied in all the direct sequence spread spectrum communication systems, especially, in a direct sequence spread spectrum communication system in a multipath fading channel.

The system architecture of a first embodiment of the present invention is shown in FIG. 1. Wherein, a radio-frequency signal received from an antenna 101 is down-converted to be a complex equivalent baseband signal by an RF front-end module 102, in which the complex equivalent baseband signal contains a real part (I(t)) and an imaginary part (Q(t)) and is sampled by an A/D converter 103 with a sampling period ($T_c$), where $T_c$ is a chip time of spreading code, to form a complex discrete time series r[n] (r[n]=I[n]+jQ[n]), which is stored in a memory 104. The stored complex discrete time series is segmented into sections of length N, wherein N can be the length of a pilot signal spreading code ($N_p$) or the length of a data signal spreading code ($N_d$). After segmentation, the segmented discrete time series (r[n]) is through fast Fourier transform (FFT) calculations to produce a received signal (R[k]) in the frequency domain.

Before discussing the correction of carrier frequency offset and spreading code timing offset, the properties of FFT matched filter and the modulation characteristics of FFT will be first described as following:

I. Properties of FFT Matched Filter $x_1[n]$ and $x_2[n]$ are discrete time signals of length N (n between 0 and N−1), the FFT of which are respectively $X_1[k]$ and $X_2[k]$. If $X_3[k]$ is equal to the product of $X_1[k]$ and $X_2^*[k]$, $x_3[n]$ will be the result of circular convolution of $x_1[n]$ and $x_2^*[((-n))_N]$. (Note: $((x))_N \equiv x \mod N$, $((x))_N$ being between 0 and N−1. The symbol * represents complex conjugate operation).

$$X_3[k]=X_1[k]X_2^*[k]$$

$$x_3[n] = \sum_{m=0}^{N-1} x_1[m] x_2 * [((n+m))_N] \quad (1)$$

wherein, $((n+m))_N$ is equal to the mod of n+m divided by N and is between 0 and N−1.

II. Modulation Characteristics of FFT

The FFT of a discrete time signal x[n] with length N is X[k]. The modulation of x[n] to carrier $\exp(j(2\pi/N)in)$ is $x[n]W_N^{-in}$, where $W_N$ is $\exp(-j2\pi/N)$. The FFT of the modulated signal is $X[((k-i))_N]$.

Depending on whether a pilot signal exists or not, the process of the method of the correction of carrier frequency offset and spreading code timing offset may be different. However, the different processes all can be implemented in the same infrastructure. The first embodiment of the present invention is the case of existing the pilot signal.

I. Existing a Pilot Signal

In the presence of a pilot signal, it is to search the integer part of carrier frequency offset first, and then estimate the fractional part of carrier frequency offset, and finally search the timing of spreading code.

a. Correction of Integer Part of Carrier Frequency Offset

The integer part of carrier frequency offset is the integer multiple of the reciprocal of the period of a pilot signal spreading-code ($1/N_p T_c$). A FFT matched filter is used to search the integer part of carrier frequency offset. By matching received signals with the pilot signal spreading code whose central frequency is located at integer multiples of the reciprocal of the period of the pilot signal spreading code, the integer part of carrier frequency offset can be determined according to the amplitudes of the matched results.

Assuming that the pilot signal spreading code is $c_p[n]$ and that the FFT of $c_p[n]$ is $C_p[k]$, the received signal r[n] within a segmented section will be:

$$r[n] = c_p[((n+\alpha))_{N_p}] \exp[j\omega_{off} n + \chi] + n[n] \quad (2)$$

wherein α is the difference between the starting point of a segmented section and that of the pilot signal spreading code, $\omega_{off}$ is carrier frequency offset, χ is the random phase and n[n] is the noise (only one main path in the channel is considered, while in the case of multiple paths in the channel, each path is identical to an unitary path).

The IFFT of $R[k]C_p^*[((k-i))_{N_p}]$ is $CR_i[n]$, which is the output of the matched filter. $CR_i[n]$ can be written as $$CR_i[n] = \sum_{m=0}^{N-1} c_p\big[((m+\alpha))_{N_p}\big] c_p * \big[ \quad (3)$$

$$((m+n))_{N_p}\big] \exp\{j\omega_{off}m - j(2\pi/N_p)i((m+n))_{N_p} + \chi\} + n'[n]$$

wherein n'[n] is generated by input noise, and when it equals zero, $CR_i[\alpha]$ will be $$CR_i[\alpha] = N_p \sum_{m=0}^{N-1} \exp\{j(\omega_{off} - (2\pi/N_p)i)m\} \exp\{-j(2\pi/N_p)i\alpha + \chi\} \quad (4)$$

Figure 2:
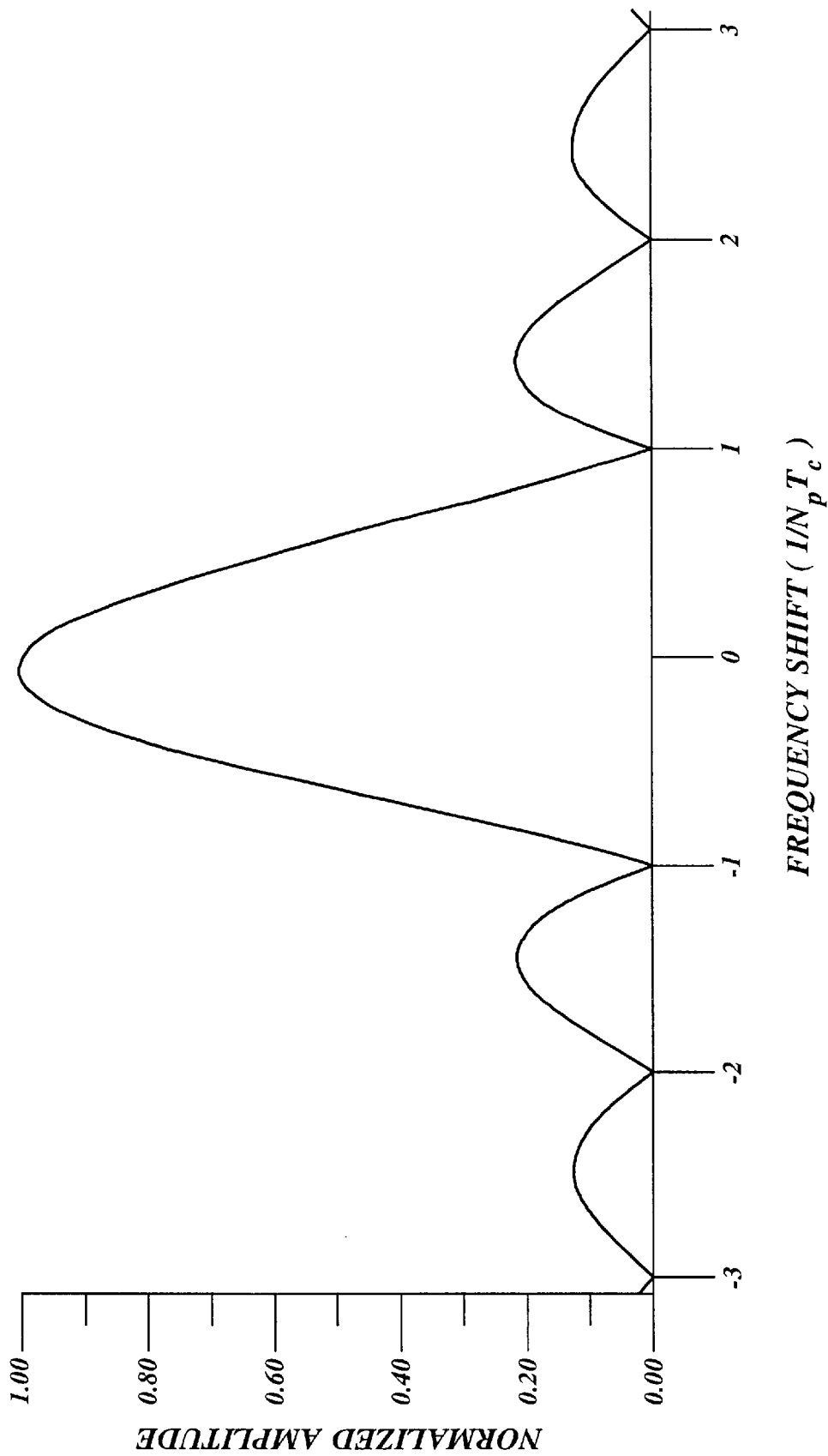
FIG. 2 shows the matched result of the matched filter of the first embodiment of the present invention.

According to Eq. (4), for i=0, $|CR_0[\alpha]|/N_p$ is plotted in FIG. 2 in which when $|\omega_{off}| \leq \pi/N_p$, $|CR_0[\alpha]|/N_p$ is larger than 0.636, and when $|\omega_{off}| \geq 2\pi/N_p$, $|CR_0[\alpha]|/N_p$ is smaller than 0.22.

To vary the values of i of Eq. (4) is to modulate the impulse response of the matched filter (i.e. the pilot signal spreading code) to the carrier with frequency of 2πi/N. After matching received signals with the modulated impulse response, of the matched filter, of central frequency being located at 2πi/N, the amplitude output is $|CR_i[\alpha]|/N_p$. If the difference between the carrier frequency offset and the central frequency of the impulse response of the matched filter is less than $\pi/N_p$ ($|\omega_{off} - 2\pi i/N_p| < \pi/N_p$), the amplitude output of matched filter will be larger than 0.636, otherwise, it will be smaller than 0.22.

According to Eq. (4), the FFT of the pilot signal spreading code can be circular shifted (i.e. varying the value of i) to obtain amplitude output of the matched filter, $|CR_i[\alpha]|/N_p$. If the integer part of carrier frequency offset is $2\pi l/N_p$, $|CR_l[\alpha]|/N_p$ will have a maximum value. After correcting the integer part of carrier frequency offset, the fractional part of carrier frequency offset, $\Delta\omega_{off}$, can be written as $$\Delta\omega_{off} = \omega_{off} - 2\pi l/N_p \quad (5)$$

wherein $2\pi l/N_p$ is the estimated integer part of carrier frequency offset and $|\Delta\omega_{off}|$ is smaller or equal to $\pi/N_p$. From FIG. 2, $|CR_0[\alpha]|/N_p$ is symmetrical to the frequency of zero. When $2\pi l/N_p \leq \omega_{off} \leq 2\pi(l+1)/N_p$ and the value of $\Delta\omega_{off}$ is close to $\pi/N_p$, the value of $|CR_l[\alpha]|/N_p$ will approximate to that of $|CR_{l+1}[\alpha]|/N_p$, and the rotation of the matched filter output is counterclockwise. Similarly, when $2\pi(l-1)/N_p \leq \omega_{off} \leq 2\pi l/N_p$ and the value of $\Delta\omega_{off}$ is close to $-\pi/N_p$, the value of $|CR_{l-1}[\alpha]|/N_p$ will approximate that of $|CR_l[\alpha]|/N_p$ and the rotating direction of the matched filter output will be clockwise.

The R[k] is multiplied by the $C_p^*[((k-i))_{N_p}]$ in the complex multiplier 108. The IFFT unit is used to calculate the IFFT of $R[k]C_p^*[((k-n))_{N_p}]$. After that, the amplitude of the output of the IFFT unit is calculated 112. And then, the correction of the integer part of carrier frequency offset 114 can be proceeded. The system block diagram of 114 is shown in FIG. 3. Searching the maximum amplitudes, being recorded as $A_p[i]$, of the IFFT calculation 301 is first proceeded. In the possible range of carrier frequency offset, change the value of i and repeat the above calculation. For the example that carrier frequency is 2.4 GHz, the chip rate of spreading code is 10 MHz, the length of spreading code is 1024, and the carrier frequency offset is below 10 ppm of carrier frequency, the searching range of i is {−3,−2,−1,0, 1,2,3}.

Comparing all the $A_p[i]$ and selecting the largest one as $A_p[l]$ 302, the integer part of carrier frequency offset can be determined as $W^{-1}$. The values of $A_p[l]$, $A_p[l+1]$ and $A_p[l-1]$ are compared 303. If $A_p[l]$ and $A_p[l+1]$ are close in magnitude, the direction flag will be 1. And if $A_p[l]$ and $A_p[l-1]$ are close in magnitude, then the direction flag will be −1. Otherwise, the direction flag is 0. Finally, the output of the control signal of the integer part of carrier frequency offset is transmitted to the complex conjugate 109 of the FFT of the spreading code or to the automatic frequency synthesizer 105 for the correction of the integer part of carrier frequency offset. (After the correction, the value of i is set to be 1 if the correction is made by the complex conjugate 109 of the FFT of spreading code, and is set to be zero if the correction is made by the automatic frequency synthesizer 105). Renewing the calculation of the output of the matched filter and searching the maximum amplitude ($AP_{max}$) are proceeded. A starting signal, the direction flag and the $AP_{max}$ are provided as the output.

b. Correction of Fractional Part of Carrier Frequency Offset

The fractional part of carrier frequency offset is obtained by estimating the phase angle difference between two successive outputs from the FFT matched filter. According to Eq.(4), assuming that the first output of the two successive output of the matched filter at the point α is as follow (the integer part of carrier frequency offset is known as $2\pi l/N_p$):

$$CR_0[\alpha] = N_p \sum_{m=0}^{N-1} \exp\{j\Delta\omega_{off}m\}\exp\{-j(2\pi/N_p)1\alpha + \chi\} \quad (6)$$

the second output at the point α will be:

$$CR_0[\alpha] = N_p \sum_{m=0}^{N-1} \exp\{j\Delta\omega_{off}m\}\exp\{-j((2\pi/N_p)1\alpha - \Delta\omega_{off}N_p) + \chi\} \quad (7)$$

From equations (6) and (7), it can be known that the phase angle difference (Δθ) between two successive outputs from the FFT matched filter is $\Delta\omega_{off}N_p$. After the above-mentioned correction of the integer part of carrier frequency offset, $|\Delta\omega_{off}|$ is smaller or equal to $\pi/N_p$, thus $|\Delta\omega_{off}N_p|$ is smaller or equal to π. The calculated phase angle difference between two successive outputs from the FFT matched filter is divided by the period of a pilot signal spreading code to obtain the fractional part of carrier frequency offset, $\Delta\theta/N_pT_c$ (in discrete-time form, $T_c=1$). In the correction of fractional part of carrier frequency the direction flag is used to decide the calculation way of phase angle difference. When the direction flag is −1, the phase angle difference (Δθ) is calculated in clockwise direction and is between 0 and −360 degree. If the direction flag is 1, the phase angle difference (Δθ) is calculated in counter-clockwise direction and is between 0 and 360 degree. When the direction flag is 0, either clockwise direction or counter-clockwise direction are used to calculate the phase angle difference and the one between 0 and 180 degree or between 0 and −180 degree is chosen to be the Δθ.

Assuming the system is a wideband CDMA system, multipath fading phenomena may be present in channels. For getting a better estimation, a few main paths can be selected to estimate the fractional part of carrier frequency offset. The system block diagram of the correction of the fractional part of carrier frequency offset 115 is shown in FIG. 4.

By deciding a threshold according to the $AP_{max}$ input, p paths of amplitude output from the matched filter greater than the threshold are selected to be main paths 401. The angle (θ[j]) of each main path is calculated 402, and then, the phase angle difference (Δθ[j]) of each main path is calculated 403 according to the direction flag. Further, the time average ($avg_t\{\Delta\theta[j]\}$) of the phase angle difference of each main path is calculated 404, and the average (Δθ) of the $avg_t\{\Delta\theta[j]\}$ of all the p paths is as follows:

$$\Delta\tilde{\theta} = 1/p \sum_{j=1}^{p} avg_t\{\Delta\theta[j]\} \quad (8)$$

$\Delta\theta/N_p$ is the estimated value of the fractional part of carrier frequency offset. The control signal of which is transmitted to the automatic frequency synthesizer 105 for the correction of the fractional part of carrier frequency offset. And then, a starting signal is provided to initiate the correction of timing offset.

c. Correction of the Timing of Spreading Code

After the correction of carrier frequency offset, the amplitude output from the FFT matched filter can be written as $|h[((n-\alpha))_{N_p}]|$, which is the amplitude of the circular shifted channel impulse response. Due to the circular convolution property of FFT matched filter, the timing of the spreading code may not be the first main path of the output from the matched filter, thus it is required to search the starting point of the channel impulse response. Assuming that the channel is a minimum phase system which has the characteristic of minimum energy delay, the main paths of channel impulse response thereof is more clustered, i.e., minimum range of the spread of main paths. The system block diagram of the correction of timing offset of spreading code is shown in FIG. 5.

By deciding a threshold according to the $AP_{max}$ input, paths of amplitude output from the matched filter greater than the threshold are defined as main paths 501. Each main path is assumed as the starting point of the timing to calculate the spread range (D[j]) of all the main paths 502. The calculation of D[j] is as follows: a circular cycle of starting point of the jth main path is defined as from the jth main path to the last point of the output of the matched filter and continually from the first point of the output of the matched filter to the point before the jth main path. D[j] is the circular distance from the first main path to the last main path of the circular cycle. The minimum of D[j] is selected as D[α] so that the α'th main path is the starting point of the timing of channel impulse response or the timing of spreading code.

II. Pilot Signal not Exists

The second embodiment of the present invention is to consider the case without a pilot signal. The data signal is used to estimate the carrier frequency offset and spreading code timing offset in such a case. The modulation of data bits is assumed to be BPSK. It requires to obtain the timing of spreading code before the correction of carrier frequency offset data for the reason of data modulation. FIG. 6 is the flow diagram of the correction of carrier frequency and timing of the second embodiment. Received signals are matched with the FFT of the data signal spreading code whose center frequency is modulated to different multiples of integer frequency offset in an FFT matched filter for generating "effective output" 601. The "effective output" is the peak produced in the amplitude output of the matched filter. The effective output is used to search the timing of spreading code 602. After correcting the timing of spreading code, searching for integer part of carrier frequency offset is proceeded 603. And then, the fractional part of carrier frequency offset is estimated by using the phase angle difference of the matched filter output 604, followed by another searching for the timing of spreading code 605.

a. Generating "effective output"

The FFT matched filter is used to process received signals for searching the "effective output". Since the timing of the segmented sections may not be synchronized with that of spreading code, the data modulation and carrier frequency offset both can influence the amplitude output of the matched filter.

Assuming that data signal spreading code is $c_d[n]$ and its FFT is $C_d[k]$, the received signal r[n] within a segmented section will be:

$$r[n]=dm[n]c_d[((n+\alpha))_{Nd}]\exp\{j\omega_{off}n+\chi\}+n[n] \; dm[n]=d1\cdot(u[n]-u[n-\alpha])+d2\cdot(u[n-\alpha]-u[n-N_d]) \quad (9)$$

wherein, α is the difference between the starting point of the segmented section and that of the data signal spreading code, $\omega_{off}$ is carrier frequency offset, χ is a random phase and n[n] is the noise. dm[n] is the series formed by two successive data bits in the segmented section, in which u[n] is a step function, d1 is the first bit of the section, and d2 the second bit. Here one main path in a channel is considered, while in a multipath channel, each path is identical to an unitary path. The IFFT of $R[k]C_d((k-i))_{Nd}$ is $CR_i[N]$ which can be written as $$CR_i[n] = \sum_{m=0}^{N-1} dm[m]c_d[((m+\alpha))_{Nd}]c_d * [((m+n))_{Nd}] \exp\left\{j\omega_{off}m - j\frac{2\pi}{N_d}i((m+n))_{Nd} + \chi\right\} + n'[n] \quad (10)$$

wherein n'[n] is generated from the input noise. When the value of n'[n] is zero, $CR_i[n]$ will be $$CR_i[n] = N_d \sum_{m=0}^{N-1} dm[m]\exp\left\{j\left(\omega_{off} - \frac{2\pi}{N_d}i\right)m\right\}\exp\left\{-j\frac{2\pi}{N_d}i\alpha + \chi\right\} \quad (11)$$

Figure 7:
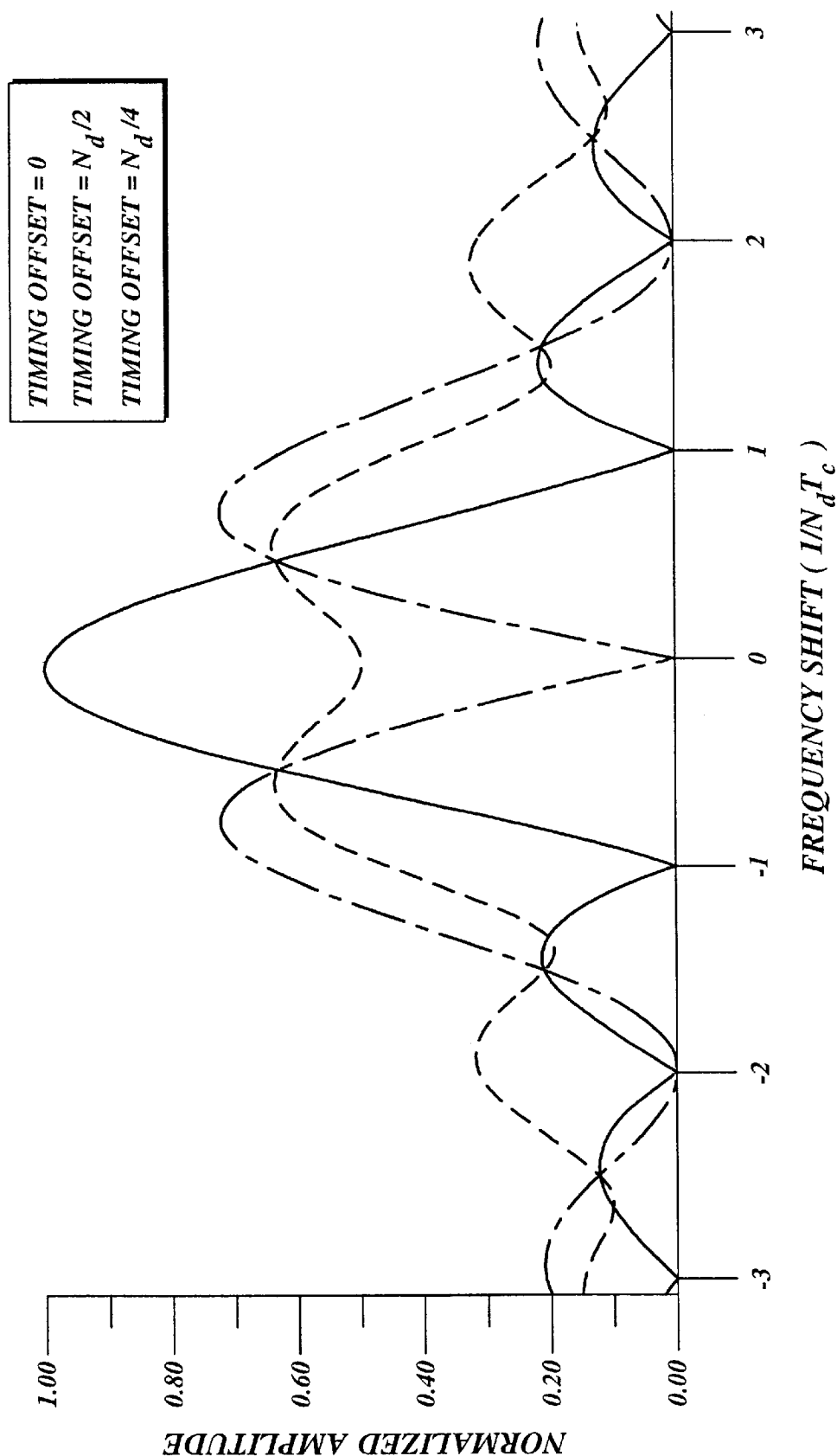
FIG. 7 shows the matched result of the matched filter of the second embodiment of the present invention.

According to Eq. (11) and for the case of i=0 and d1=−d2, $|CR_0[\alpha]|/N_d$ at $\alpha$=0, $\alpha=N_d/4$ and $\alpha=N_d/2$ are plotted in FIG. 7, from which when $\alpha=N_d/2$ and $\omega_{off}$=0, $|CR_0[\alpha]|/N_d$ is zero, and when $\alpha=N_d/2$ and $\omega_{off}=\pm 2\pi/N_d$, $|CR_0[\alpha]|/N_d$ is 0.636. From the first example, it can be known that although there is no carrier frequency offset, the output of the matched filter is zero as a result of data modulation. In the second example, if the input signal is matched with the data signal spreading code whose central frequency is $2\pi/N_d$ or $-2\pi/N_d$, there is an amplitude output being 0.636. Thus, in the matching of the input signal with data signal spreading code of different central frequencies, a peak will be generated in one of the matching. When d1=d2, the situation is identical to that in the first embodiment (existing a pilot signal), a peak is certainly generated.

The R[k] is multiplied with the $C_d*[((k-i))_{Nd}]$ in the complex multiplier 108. After that, the amplitude of the output of the IFFT unit is calculated. Maximum amplitudes of the IFFT calculation is searched and recorded as $A_p[i]$. In the possible range of carrier frequency offset, change the value of i and repeat the above calculation. For the example that carrier frequency is 2.4 GHz, the chip rate of spreading code is 10 MHz, the length of spreading code is 1024, and the carrier frequency offset is below 10 ppm of carrier frequency, the searching range of i is {−3,−2,−1,0,1,2,3}.

Comparing all the $A_p[i]$ and selecting the largest one as $AP_{max}$, the output of matching R[k] with $C_d*[((k-l))_{Nd}]$ will be the "effective output."

The "effective output" obtained in step a is used in a subsequent step (step b) for the first correction of timing. The system block diagram thereof is the same as shown in FIG. 3.

b. First Correction of Timing

After step a, the "effective output" is generated from the matched filter, and the peak thereof is in the main path of the circular shifted channel impulse response. Therefore, the method and principle of correcting the timing are identical to the case of existing a pilot signal except using the "effective output" obtained from step a for correcting the timing. The system block diagram thereof is shown in FIG. 5.

c. Correction of Integer Part of Carrier Frequency Offset

After step b, the timing of data signal spreading code is synchronized to that of the segmented section, thus the data modulation will not affect the amplitude output of the matched filter. Therefore, the method and principle of correcting the integer part of carrier frequency offset is identical to the case of existing a pilot signal.

In step c, the integer part of carrier frequency offset is corrected and a direction flag is generated to be used in a subsequent step (step d). The correction of integer part of carrier frequency offset is similar to the way of generating the "effective output" in step a, for the reason that they all search and compare the maximum amplitude output of the matched filter, thus they can share a common sub-system which system block diagram is the same as that shown in FIG. 3.

d. Correction of Fractional Part of Carrier Frequency Offset

Without data modulation fractional part of carrier frequency offset causes the phase angle difference($\Delta\theta$) between two successive outputs from the FFT matched filter. With data modulation the phase angle difference ($\Delta\phi$) between two successive outputs from the matched filter can be measured. However, the data modulation can produce a ambiguity of 180 degree between $\Delta\phi$ and $\Delta\theta$, thus $\Delta\phi$ need to be corrected for estimating $\Delta\theta$. According to Eq.(11), assuming that the first output of the two successive output of the matched filter at the point $\alpha$ is as follow—(the integer part of carrier frequency offset is known as $2\pi l/N_p$):

$$CR_o[\alpha] = d1 \cdot N_d \sum_{m=0}^{N-1} \exp\{j\Delta\omega_{off}m\}\exp\{-j(2\pi/N_d)1\alpha + \chi\} \quad (12)$$

The second output at the point $\alpha$ is $$CR_0[\alpha] = d2 \cdot N_d \sum_{m=0}^{N-1} \exp\{j\Delta\omega_{off}m\}\exp\left\{-j\left(\frac{2\pi}{N_d}1\alpha - \Delta\omega_{off}N_d\right) + \chi\right\} \quad (13)$$

wherein d1 is the first data bit and d2 is the second data bit. After the above correction of integer part of carrier frequency offset, $|\Delta\theta|$ ($\Delta\theta=\Delta\omega_{off}N_d$) is smaller or equal to $\pi$. When d1=d2, $\Delta\phi$ is equal to $\Delta\theta$. When d1=−d2, $\Delta\phi$ is equal to $\Delta\theta+\pi$ or $\Delta\theta-\pi$. In the second case (d1=−d2), $\Delta\theta+\pi$ and $\Delta\theta-\pi$ has the same value for the reason that the inverse tangent function can determine the angle between 0 to 360 degree only.

The phase angle difference of the output from the matched filter is calculated by using the direction flag, and then the ambiguity of 180 degree caused by the data modulation is corrected to obtain the phase angle difference caused by the fractional part of carrier frequency offset.

When the direction flag is 1, the rotating direction of the output of the matched filter is counter-clockwise. Since $\Delta\phi$ and $\Delta\theta$ are both positive, they are respectively changed to be $\Delta\phi^+$ and $\Delta\theta^+$. $\Delta\phi^+$ is calculated counter-clockwise and is between 0 and 360 degree. $\Delta\phi^+$ may be $\Delta\theta^+$ or $\Delta\theta^++\pi$. To overcome the ambiguity of 180 degrees caused by the data modulation, $\Delta\phi^+$ can be corrected to be $\Delta\theta^+$ by using the characteristic that $\Delta\theta^+$ is between 90 and 270 degrees when the direction flag=1, as given in Table 1.

TABLE 1

| $\Delta\phi^+$ | $\Delta\theta^+$ |
| --- | --- |
| 0~0.5π | $\Delta\phi^+ + \pi$ |
| 0.5~1.5π | $\Delta\phi^+$ |
| 1.5~2π | $\Delta\phi^+ - \pi$ |

When the direction flag is −1, the rotating direction of the output of the matched filter is clockwise. Since $\Delta\phi$ and $\Delta\theta$ are both negative, they are respectively changed to be $\Delta\phi^-$ and $\Delta\theta^-$. $\Delta\phi^-$ is calculated clockwise and is between 0 and −360 degree. $\Delta\phi^-$ may be $\Delta\theta^-$ or $\Delta\theta^-$−π. To overcome the ambiguity 180 degrees caused by the data modulation, $\Delta\phi^-$ can be corrected to be $\Delta\theta^-$ by using the characteristic that $\Delta\theta^-$ is between −90 and −270 degrees when the direction flag=−1, as given in Table 2.

TABLE 2

| $\Delta\phi^-$ | $\Delta\theta^-$ |
|---|---|
| 0~−0.5π | $\Delta\phi^-$ − π |
| −0.5π~−1.5π | $\Delta\phi^-$ |
| −1.5π~−2π | $\Delta\phi^-$ + π |

When the direction flag is 0, the absolute value of the phase angle difference is smaller than 180 degrees ($|\Delta\theta|<180$) and the rotating direction of the output of the matched filter is undetermined. Therefore, $\Delta\phi^-$ is calculated clockwise while $\Delta\phi^+$ is calculated counter-clockwise. $\Delta\phi^-$ is between 0 to −360 degree and $\Delta\phi^+$ is between 0 to 360 degree. Assuming that $\Delta\phi^+$ is between 0 to 180 degree and $\Delta\theta^-$ is between 0 to −180 degree, when $\Delta\phi^+$ is larger than 180 degree or $\Delta\phi^-$ is smaller than −180 degree, the ambiguity of 180 degree caused by data modulation should be corrected. When $\Delta\phi^+$ is larger than 180 degree, $\Delta\theta^+$ is equal to $\Delta\phi^+$−π. When $\Delta\phi^-$ is less than −180 degree, $\Delta\theta^-$ equals to $\Delta\phi^-$+π. Table 3 shows the relationship of $\Delta\phi^+$, $\Delta\theta^+$, $\Delta\phi^-$ and $\Delta\theta^-$. From Table 3 it can be known that $\Delta\phi^-$ is equal to $\Delta\phi^+$−2π and $\Delta\theta^-$ is equal to $\Delta\theta^+$−π. Therefore, when the direction flag is 0, $\Delta\theta^+$ can be first calculated and used to obtain $\Delta\theta^-$ by subtracting 180 degrees therefrom.

TABLE 3

| $\Delta\phi^+$ | $\Delta\phi^- = \Delta\phi^+ - 2\pi$ | $\Delta\theta^+$ | $\Delta\theta^- = \Delta\theta^+ - \pi$ |
|---|---|---|---|
| 0~π | −2π~−π | $\Delta\phi^+$ | $\Delta\phi^+$ − π |
| π~2π | −π~0 | $\Delta\phi^+$ − π | $\Delta\phi^+$ − 2π |

Assuming that the system is a wideband CDMA system, multipath fading phenomena may be present in its channels. To obtain a better estimation, a few main paths can be selected to estimate the fractional part of carrier frequency offset. The system block diagram is shown in FIG. 8.

By deciding a threshold according to the $AP_{max}$ input, p main paths of amplitude output from the matched filter greater than the threshold can be selected 801. The angle ($\phi[j]$) of each main path is calculated 802, and then, the phase angle difference of each main path is calculated 803, according to the direction flag, and corrected 804. And then the time average of phase angle difference in each main path is calculated 805.

When the direction flag is 1, the time averaged phase angle differences of each main path ($avg_t\{\Delta\theta^+[j]\}$) is calculated and averaged over all the main paths as $\Delta\theta^+$.

$$\Delta\tilde{\theta}^+ = 1/p \sum_{j=1}^{p} avg_t\{\Delta\theta^+[j]\} \tag{14}$$

$\Delta\theta^+/N_d$ is the estimated value of the fractional part of carrier frequency offset.

When the direction flag is −1, the time averaged phase angle differences of each main path ($avg_t\{\Delta\theta^-[j]\}$) is calculated and averaged over all the main paths as $\Delta\theta^-$.

$$\Delta\tilde{\theta}^- = 1/p \sum_{j=1}^{p} avg_t\{\Delta\theta^-[j]\} \tag{15}$$

$\Delta\theta^-/N_d$ is the estimated value of the fractional part of carrier frequency offset.

When the direction flag is not zero, the control signal of fractional part of carrier frequency offset is transmitted to the automatic frequency synthesizer 105 for correcting the fractional part of carrier frequency offset and a starting signal is provided to initiate the correction of timing.

When the direction flag is zero, the phase angle difference of each main path is calculated counter-clockwise and corrected. And then, the time averaged phase angle differences of each main path ($avg_t\{\Delta\theta^+[j]\}$) is calculated and averaged over all the main paths as $\Delta\theta^+$. The estimated clockwise phase angle difference ($\Delta\theta^-$) is $\Delta\theta^+$−π. The fractional part of carrier frequency offset estimated clockwise and counter-clockwise are respectively $\Delta\theta^+/N_d$ and $\Delta\theta^-/N_d$. Only one of these two values is correct. The correct one can be chosen by using a trial and error method. By comparing the maximum amplitudes of the outputs from the matched filter with fractional part of carrier frequency offset corrected using the two values, the correct one of the two values will be the one resulting in the larger maximum amplitude of the comparison.

$\Delta\theta^+/N_d$ is transmitted to the automatic frequency synthesizer to correct the carrier frequency offset first, and the maximum amplitude output ($AP^+_{max}$) of the matched filter after the correction is recorded. Then, $\Delta\theta^-/N_d$ is transmitted to the automatic frequency synthesizer for correcting carrier frequency offset, and the maximum amplitude output ($AP^-_{max}$) of the matched filter after this correction is also recorded. $AP^+_{max}$ and $AP^-_{max}$ are compared and the estimation of the fractional part of carrier frequency offset corresponding to the larger one of the comparison will be determined as the correct one. The control signal of fractional part of carrier frequency offset is transmitted to the automatic frequency synthesizer for correcting the fractional part of carrier frequency offset and a starting signal is provided to initiate the correction of timing.

e. Second Correction of Timing

In the first correction of timing, it is possible that the carrier frequency offset will cause the decay of signal-to-noise ratio (SNR) of the signal output from the matched filter, which results in the correction of timing being incorrect. Therefore, a second correction of timing may be necessary. After step d, the carrier frequency offset has been corrected, and thus the second correction of timing will obtain a better result. The method of correcting the timing is the same as that given in step c.

The technical features and technical contents of the present invention have been fully disclosed as above. Any modifications or replacements made by people skilled in the art based on the disclosure and teaching of the present invention shall not be excluded from the scope of the present invention.

What is claimed is:

1. A method for correcting carrier frequency offset in a direct sequence spread spectrum communication system comprising the steps of:

matching received signals with a spreading code whose central frequency is located at integer multiples of the reciprocal of the period of said spreading code;

searching the matched result, with the largest amplitude to obtain integer part of said carrier frequency offset which is of a certain integral multiple of the reciprocal of the period of said spreading code;

determining a direction flag by comparing the searched result with the previous and the next matched results;

calculating a phase angle difference of two successive matched results according to said direction flag;

calculating fractional part of said carrier frequency offset by using said phase angle difference; and correcting said integer part and fractional part of said carrier frequency offset.

2. The method of claim 1, wherein said spreading code is a known pilot signal spreading code.

3. The method of claim 1, wherein said spreading code is a data signal spreading code further comprising the stops of:

searching the peaks generated from the matching of said data signal spreading code with said received signals; and correcting the timing of said data signal spreading code by using said peaks of a minimum delay spread range.

4. The method of claim 1, wherein said matching is performed by a fast Fourier transform matched filter.

5. The method of claim 1 or 3, wherein in said step of determining a direction flag, when the searched result is close in magnitude to the next matched result, the direction flag is set to indicate counter clockwise; when the matched result is close in magnitude to the previous matched result, the direction flag is set to indicate clockwise; otherwise, the direction flag is set to be zero.

6. The method of claim 5, wherein in said step of calculating a phase angle difference, if said direction flag is zero, the phase angle difference is calculated either counter clockwise or clockwise, and the calculated phase angle difference is between 0 and 180 degrees and between 0 and −180 degrees, respectively.

7. The method of claim 1 or 3, wherein said step of calculating fractional part of said carrier frequency offset further comprises:

dividing said phase angle difference by the length of said spreading code.

8. The method of claim 1 or 3, wherein said step of calculating fractional part of said carrier frequency offset further comprises:

defining main paths having amplitude, obtained from the matching, larger than a pre-defined threshold value;

calculating the phase angle difference between two successive matched results of each main path according to said direction flag;

calculating the average value of said phase angle difference; and dividing said average value by the length of said spreading code.

9. The method of claim 1 or 3, wherein said integer part of said carrier frequency offset is corrected right after said step of determining a direction flag.

10. A method for correcting carrier frequency offset and spreading code timing offset in a direct sequence spread spectrum communication system, comprising the steps of:

matching received signals with a spreading code whose central frequency is located at integer multiples of the reciprocal of the period of said spreading code;

searching the matched result, with the largest amplitude to obtain integer part of said carrier frequency offset which is of a certain integral multiple of the reciprocal of the period of said spreading code;

determining a direction flag by comparing the searched result with the previous and the next matched result;

calculating a phase angle difference of two successive matched results according to said direction flag;

calculating fractional part of said carrier frequency offset by using said phase angle difference;

correcting said integer part and fractional part of said carrier frequency offset; and correcting the timing offset of said spreading code by using said largest amplitude, obtained from the matching of minimum delay spread.

11. The method of claim 10, wherein said spreading code is a known pilot signal spreading code.

12. The method of claim 10, wherein said spreading code is a data signal spreading code further comprising the steps of:

searching the peaks generated from the matching of said data signal spreading code with said received signals; and correcting the timing of said data signal spreading code by using said peaks of a minimum delay spread range.

13. The method of claim 10 or 12, wherein said matching is performed by a fast Fourier transform matched filter.

14. The method of claim 10 or 12, wherein in said step of determining a direction flag, when the searched result is close in magnitude to the next matched result, the direction flag is set to indicate counter clockwise; when the matched result is close to the previous matched result, the direction flag is set to indicate clockwise; otherwise, the direction flag is set to be zero.

15. The method of claim 14, wherein in said step of calculating a phase angle difference, if said direction flag is zero, the phase angle difference is calculated either counter clockwise or clockwise, and the calculated phase angle difference is between 0 and 180 degrees and between 0 and −180 degrees, respectively.

16. The method of claim 10 or 12, wherein said step of calculating fractional part of said carrier frequency offset further comprises:

dividing said phase angle difference by the length of said spreading code.

17. The method of claim 10 or 12, wherein said step of calculating fractional part of said carrier frequency offset further comprises:

defining main paths having amplitude, obtained from the matching, larger than a pre-defined threshold value;

calculating the phase angle difference between two successive matched results of each main path according to said direction flag;

calculating the average value of said phase angle difference; and dividing said average value by the length of said spreading code.

18. The method of claim 10 or 12, wherein said step of correcting the timing offset of said spread spectrum code further comprises:

defining main paths having amplitude, obtained from the matching, larger than a pre-defined threshold value;

calculating delay spread ranges of all the main paths by using each main path as a starting point; and using the starting main path of the minimum delay spread range as the starting point of the timing of said spreading code.

19. The method of said claim 10 or 12, wherein said integer part of said carrier frequency offset is corrected right after said step of determining a direction flag.

20. A receiver, used in a direct sequence spread spectrum communication system, comprising an antenna and a RF front-end, is characterized in that said receiver comprises:

a matching device for matching received signals with a spreading code whose central frequency is located at integer multiples of the reciprocal of the period of said spreading code;

a searching device for receiving output amplitudes from said matching device and determining, by searching the result with the largest output amplitude, the integer part of carrier frequency offset which is of a certain integral multiple of the reciprocal of the period of said spreading code;

a comparing device for determining a direction flag by comparing the searched result with the previous and the next matched results;

a first calculating device for calculating a phase angle difference of two successive outputs of said matching device according to said direction flag, and calculating fractional part of said carrier frequency offset by using said phase angle difference;

a first correcting device for reading the outputs of said searching device and said first calculating device to correct said integer part and fractional part of said carrier frequency offset;

a second calculating device for receiving an output of said matching device after said carrier frequency offset has been corrected and calculating out the minimum spread of the amplitudes of said output of said matching device to determine the timing of said spreading code; and a second correcting device for reading said output of said second calculating device to change an input signal window of said matching device for correcting the timing of said spreading code.

21. The receiver of claim 20, wherein said spreading code is a known pilot signal spreading code.

22. The receiver of claim 20, wherein said spreading code is a data signal spreading code, and said searching device is also used for searching the peaks of the output amplitudes of said matching device, and said second calculating device is also used for calculating out the minimum delay spread range of said peaks to determine the timing of said data signal spreading code.

23. The receiver of claim 20 or 22, wherein said matching device is a fast Fourier transform matched filter.

24. The receiver of claim 20 or 22, wherein said searching device comprises:

a control unit for shifting the central frequency of said spreading code; and a selecting unit for selecting the largest one of said output amplitudes of said matching device.

25. The receiver of claim 21, wherein said first calculating device comprises:

a selecting unit for selecting the amplitudes output from the matching device larger than a threshold value as main paths;

a first calculating unit for calculating the phase angle difference between two successive matched results of each main path according to said direction flag;

an averaging unit for calculating the average value of said phase angle differences; and a second calculating unit for dividing said average value by the length of said spreading code to obtain said fractional part of said carrier frequency offset.

26. The receiver of claim 22, wherein said first calculating device comprises:

a selecting unit for selecting the output amplitudes from the matching device larger than a threshold value as main paths;

a first calculating unit for calculating the phase angle difference between two successive matched results of each main path according to said direction flag;

a correcting unit for correcting the ambiguity, caused by data modulation, of the calculated phase angle differences according to said direction flag;

an averaging unit for calculating the average value of the corrected phase angle differences; and a second calculating unit for dividing said average value by the length of said spreading code to obtain said fractional part of said carrier frequency offset.

27. The receiver of claim 20 or 22, wherein said integer part of said carrier frequency offset is corrected by said first correcting device before said first calculating device is initiated.

28. The receiver of claim 20 or 22, wherein said second calculating device comprises:

a selecting unit for selecting the output amplitudes from the matching device larger than a threshold value as main paths;

calculating unit for using each main path as a starting point to respectively calculate the delay spread range of all the main paths; and a determining unit for using the starting main path of the minimum delay spread range as the starting point of the timing of said spreading code.

\* \* \* \* \*

UNITED STATES PATENT AND TRADEMARK OFFICE
CERTIFICATE OF CORRECTION

PATENT NO. : 6,266,361 B1
DATED : July 24, 2001
INVENTOR(S) : C.-C. Huang et al.

It is certified that error appears in the above-identified patent and that said Letters Patent is hereby corrected as shown below:

<u>Title page,</u>
Item [57], ABSTRACT, line 18, "sag." should read -- flag. --

Signed and Sealed this

Thirtieth Day of April, 2002

Attest:

Attesting Officer

JAMES E. ROGAN
*Director of the United States Patent and Trademark Office*